(12) United States Patent
Zhuang et al.

(10) Patent No.: US 11,604,265 B2
(45) Date of Patent: Mar. 14, 2023

(54) SINGLE SPAD ARRAY RANGING SYSTEM

(71) Applicant: STMicroelectronics (Research & Development) Limited, Marlow (GB)

(72) Inventors: Caixin Zhuang, Singapore (SG); John Kevin Moore, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 674 days.

(21) Appl. No.: 16/696,984

(22) Filed: Nov. 26, 2019

(65) Prior Publication Data

US 2020/0096620 A1 Mar. 26, 2020

Related U.S. Application Data

(62) Division of application No. 15/228,757, filed on Aug. 4, 2016, now Pat. No. 10,495,736.

(51) Int. Cl.
  *G01S 7/4865* (2020.01)
  *G01S 17/89* (2020.01)
  *G01S 17/10* (2020.01)
  *G01S 7/4863* (2020.01)

(52) U.S. Cl.
  CPC .......... *G01S 7/4865* (2013.01); *G01S 7/4863* (2013.01); *G01S 17/10* (2013.01); *G01S 17/89* (2013.01)

(58) Field of Classification Search
  CPC ...... G01S 7/4865; G01S 7/4863; G01S 17/10; G01S 17/89; G01S 7/497
  See application file for complete search history.

(56) References Cited

U.S. PATENT DOCUMENTS

| | | | |
|---|---|---|---|
| 7,755,743 B2 | 7/2010 | Kumahara et al. | |
| 2007/0182949 A1 | 8/2007 | Niclass | |
| 2010/0314531 A1 | 12/2010 | Menge | |
| 2013/0153754 A1 | 6/2013 | Drader et al. | |
| 2014/0231631 A1 | 8/2014 | Moore et al. | |
| 2015/0083900 A1 | 3/2015 | Caley et al. | |
| 2015/0120241 A1 | 4/2015 | Kadambi et al. | |
| 2016/0033644 A1 | 2/2016 | Moore | |
| 2016/0064579 A1 | 3/2016 | Hirigoyen et al. | |
| 2016/0128162 A1 | 5/2016 | Raynor | |
| 2016/0291316 A1 | 10/2016 | Mellot et al. | |
| 2017/0139041 A1* | 5/2017 | Drader | G01S 7/487 |
| 2017/0187721 A1 | 6/2017 | Raynor | |
| 2018/0038945 A1 | 2/2018 | Zhuang et al. | |
| 2018/0195900 A1* | 7/2018 | Delic | G01J 1/44 |

* cited by examiner

*Primary Examiner* — Nam D Pham
(74) *Attorney, Agent, or Firm* — Seed IP Law Group LLP

(57) ABSTRACT

In one embodiment, an imaging device includes a light-emitting device, a driving circuit, a return single-photon avalanche diode (SPAD) array and readout circuitry. The driving circuit generates a driving signal, and the light-emitting device generates an optical pulse based on the driving signal. The return SPAD array is configured to receive a first portion of the optical pulse that is reflected by an object in an image scene. The readout circuitry receives a signal indicative of the received first portion of the optical pulse, and a signal indicative of the driving signal, and determines a distance between the imaging device and the object based on a difference between a time of receiving the signal indicative of the received first portion of the optical pulse and a time of receiving the signal indicative of the driving signal.

20 Claims, 5 Drawing Sheets

SINGLE SPAD ARRAY RANGING SYSTEM

BACKGROUND

Technical Field

The present disclosure is generally directed to imaging devices and methods, and more particularly, to imaging devices and methods including a single sensor array, such as a single-photon avalanche diode (SPAD) array.

Description of the Related Art

Ranging devices, such as time of flight (ToF) sensors, are typically used to detect the distance to nearby objects and are able to do so without physically touching the object. Such devices and sensors may be utilized in various electronic devices, such as cameras, phones, including smartphones, vehicles, machinery, and other devices for detecting the distance to nearby objects.

Conventional ranging devices typically include a light-emitting device (e.g., a laser or a LED), a return sensor array, a reference sensor array, and circuitry for driving an output light emission and for processing signals received by the return and reference sensor arrays. The return and reference sensor arrays may be single-photon avalanche diode (SPAD) arrays.

Generally described, the light-emitting device emits radiation into an image scene. Some portion of the emitted radiation is reflected off of an object in the image scene and back toward the return sensor array. Another portion of the emitted radiation is reflected by an internal optical barrier, and this reflected radiation is received by the reference sensor array. The return and reference arrays generate respective electrical signals indicative of the received radiation, which is transmitted to the processing circuitry (e.g., a readout circuit) which determines the distance to the object based on a difference in time in receiving the signals from the return and reference sensor arrays. The inclusion of both a return and a reference sensor array in conventional ToF sensors is needed in order to remove voltage and temperature dependent time offsets from the range result, and to thus provide an accurate range or distance measurement.

This scheme is effective but has several drawbacks. For example, the reference array and associated routing takes up a portion of silicon area on the chip, which thus may not be utilized for other components or circuitry. Additionally, conventional ranging devices need to provide supply power to support both the return and reference sensor arrays, which results in increased power consumed by such devices.

BRIEF SUMMARY

The present disclosure is generally directed to imaging devices, such as time of flight (ToF) ranging devices that determine a range or distance utilizing a single SPAD array. In contrast to conventional ToF ranging devices, which rely on a reference array and a return array, embodiments provided by the present disclosure utilize a driving signal provided from a driver (e.g., a vertical cavity surface emitting laser (VCSEL) driver) to the light-emitting device, in place of the reference SPAD array utilized in conventional devices.

In a conventional ToF ranging device, a pulse is generated in a controller or a digital pulse generator, and the pulse may propagate through analog readout circuitry, to the driver and then through the light-emitting device (such as a vertical cavity surface emitting laser (VCSEL)). Propagation delays are thus introduced through each of these components. The VCSEL emits light based on the received pulse, which is reflected off a target object and received by the return SPAD array, and an internally reflected portion of the emitted light is received by the reference SPAD array. Additional propagation delays are then introduced as a return signal (i.e., a light or photon detection signal) is transmitted from the return SPAD array through return SPAD front end circuitry (which may include, for example, pulse shaping circuitry and OR-tree circuitry), through a routing channel and then to a readout circuit. Separately, additional propagation delays are introduced in a path from the reference SPAD array through reference SPAD front end circuitry, the routing channel and to the readout circuit. Routing matching and other compensation techniques can be employed in order to compensate for the different propagation delays through the reference path and the return path.

In one or more embodiments provided by the present disclosure, a driving signal from the driver (e.g., a VCSEL driver) is fed directly into the circuitry in a reference path (e.g., reference SPAD front end circuitry and reference routing channel). That is, the reference sensor array, as in conventional imaging devices, is removed (and/or bypassed) and is replaced by providing the driving signal directly into the reference path. This driving signal experiences the dominant source of propagation delay (i.e., the delay associated with propagation of a pulse from a pulse generator, through the readout circuitry and to the VCSEL driver), and thus this dynamic, voltage and temperature dependent delay source is common to both the return path and the reference path. Accordingly, that portion of propagation delay is inherently compensated (i.e., it is not a source of ranging inaccuracies). While some portion of propagation delay is not common between the return and reference paths (e.g., delays through the light-emitting device and through the return SPAD array), which produces some amount of ranging inaccuracy, the benefit of area reduction realized by implementing a single SPAD array (i.e., without inclusion of a reference SPAD array) may outweigh the loss of absolute range accuracy in certain applications, particularly applications that are not dependent on absolute range accuracy (e.g., gesture recognition, user detection, and the like).

In one embodiment, the present disclosure provides an imaging device that includes a light-emitting device, a driving circuit, a return SPAD array and readout circuitry. The driving circuit is coupled to the light-emitting device and is configured to generate a driving signal. The light-emitting device is configured to generate an optical pulse based on the driving signal. The return SPAD array is configured to receive a first portion of the optical pulse that is reflected by an object in an image scene. The readout circuitry is coupled to the return SPAD array and configured to receive a signal indicative of the received first portion of the optical pulse. The readout circuitry is further coupled to the driving circuit and is configured to receive a signal indicative of the driving signal. The readout circuitry is configured to determine a distance between the imaging device and the object based on a difference between a time of receiving the signal indicative of the received first portion of the optical pulse and a time of receiving the signal indicative of the driving signal.

In another embodiment, the present disclosure provides a method of making an imaging device that includes: coupling a driving circuit to a light-emitting device; coupling an output of a return single-photon avalanche diode (SPAD) array to a return front end circuit configured to process a photon detection signal provided at the output of the return SPAD array; coupling an output of the return front end circuit to a readout circuit via a return routing channel, the readout circuit being configured to receive a signal indicative of a first portion of an optical pulse transmitted by the light-emitting device into an image scene and reflected by an object in the image scene; and coupling the driving circuit to the readout circuit via a reference front end circuit and a reference routing channel, the readout circuit being configured to receive a signal indicative of a driving signal provided by the driving circuit to drive the transmission of the optical pulse by the light-emitting device, wherein the readout circuit is configured to determine a distance between the imaging device and the object based on a difference between a time of receiving the signal indicative of the received first portion of the optical pulse and a time of receiving the signal indicative of the driving signal.

In yet another embodiment, the present disclosure provides an electronic device that includes a microprocessor and an imaging device coupled to the microprocessor. The imaging device includes a light-emitting device configured to generate an optical pulse and a driving circuit coupled to the light-emitting device and configured to generate a driving signal, the light-emitting device being configured to generate the optical pulse based on the driving signal. The imaging device further includes a return SPAD array and readout circuitry. The return SPAD array is configured to receive a first portion of the optical pulse, the first portion being reflected by an object in an image scene. The readout circuitry is coupled to the return SPAD array and configured to receive a signal indicative of the received first portion of the optical pulse, and is further coupled to the driving circuit and configured to receive a signal indicative of the driving signal. The readout circuitry is configured to determine a distance between the imaging device and the object based on a difference between a time of receiving the signal indicative of the received first portion of the optical pulse and a time of receiving the signal indicative of the driving signal.

DETAILED DESCRIPTION

Embodiments are directed to imaging devices and methods for determining a distance to a target object utilizing a single SPAD array. In particular, embodiments provided by the present disclosure utilize a driving signal provided from a driver to a light-emitting device to replace and/or bypass the reference SPAD array utilized in conventional devices.

Figure 1:
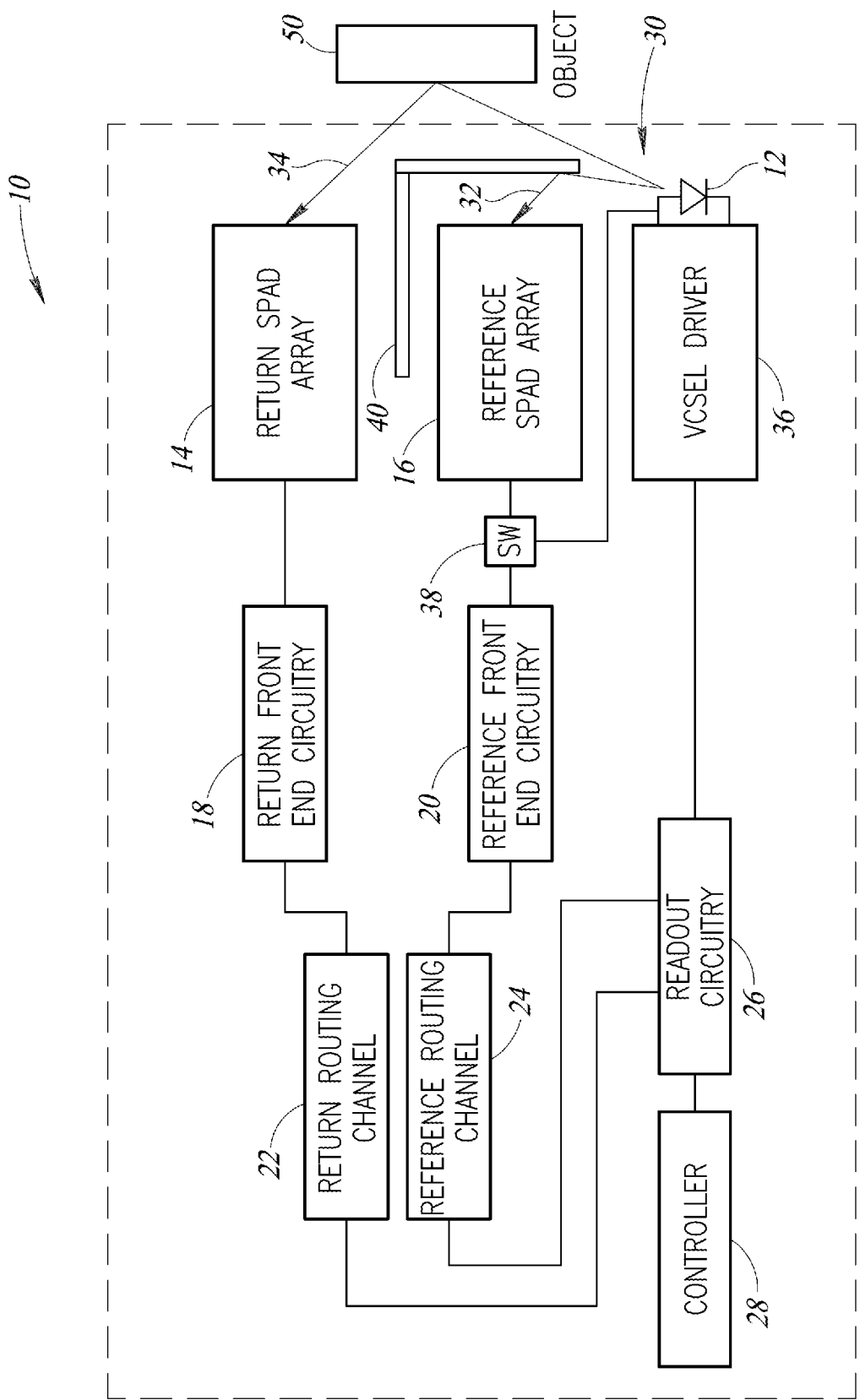
FIG. 1 is a block diagram illustrating an imaging device that includes a return SPAD array and a reference SPAD array.

FIG. 1 illustrates an imaging device 10 that includes a light-emitting device 12 for generating and transmitting an optical pulse 30 into an image scene, which may contain an object 50.

The light-emitting device 12 may be, for example, a vertical cavity surface emitting laser (VCSEL) or a light-emitting diode (LED).

The imaging device 10 includes an optical barrier 40, which reflects a first portion 32 (which may be referred to herein as "reference portion 32") of the optical pulse toward a reference single-photon avalanche diode (SPAD) array 16. A second portion 34 (which may be referred to herein as "return portion 34") of the optical pulse 30 is reflected off of the object 50 in the image scene, and is received at a return SPAD array 14.

The return SPAD array 14 may include, for example, an array of between four and several thousand SPAD cells. As will be appreciated by those skilled in the art, SPAD arrays can be used for a variety of applications, including for ranging, for 2D or 3D gesture recognition and for 3D imaging. Each SPAD cell in the return SPAD array 14 will provide an output pulse or detectable SPAD event when a photon in the form of the return portion 34 of the optical pulse 30 is detected by that cell.

The reference SPAD array 16 may be, for example, of the same dimensions or of smaller dimensions than the return SPAD array 14, and receives an internal reflection (i.e., the reference portion 32 reflected by the optical barrier 40) of the transmitted optical pulse 30. In some embodiments, the reference SPAD array 16 is a mono-dimensional array, for example, having only a row or column of SPAD cells. Each SPAD cell in the reference SPAD array 16 will provide an output pulse or detectable SPAD event when a photon in the form of the reference portion 32 of the optical pulse 30 is detected by that cell.

The return SPAD array 14 is coupled to the readout circuitry 26 through a return path, which includes return SPAD front end circuitry 18 and a return routing channel 22. Similarly, the reference SPAD array 16 is coupled to the readout circuitry 26 through a reference path that includes reference SPAD front end circuitry 20 and a reference routing channel 24.

The return front end circuitry 18 may include any front end processing circuitry for processing, quantizing in time, shaping or otherwise detecting the receipt of a photon by the return SPAD array 14, including, for example, pulse shaping and OR-tree circuitry. Similarly, the reference front end circuitry 20 may include any front end processing circuitry for processing, quantizing in time, shaping or otherwise detecting the receipt of a photon by the reference SPAD array 16, such as pulse shaping and OR-tree circuitry.

The return front end circuitry 18 and reference front end circuitry 20 are coupled to the readout circuitry 26 via a return routing channel 22 and a reference routing channel 24, respectively. The return and reference routing channels 22, 24 are conductive routing paths for transmitting the signals received from the return SPAD front end circuitry 18 and reference SPAD front end circuitry 20, respectively, to the readout circuitry 26.

The readout circuitry 26 receives signals representing detected photons from both the return SPAD array 14 and the reference SPAD array 16 (after processing by the respective SPAD front end circuitry 18, 20 and transmission through respective routing channels 22, 24) and estimates the distance between the imaging device 10 and the object 50 based on the received signals. For example, the readout circuitry 26 may estimate the delay between transmission of the optical pulse 30 and detection of the return portion 34 by the return SPAD array 14 in order to provide a range estimate in the form of the detected distance to the object 50. The readout circuitry 26 determines the time of flight based upon the difference between the transmission time of the transmitted optical pulse 30 and the arrival time of the returned portion 34 of the optical pulse.

Due to delays introduced through various portions of the imaging device 10 from the time a pulse is generated, transmitted, received by the return SPAD array 14, processed and finally received by the readout circuitry 26 (e.g., delays through circuitry including the VCSEL driver 36, the return SPAD array 14, the return SPAD front end circuitry 18 and the return routing channel 22), the distance to the object 50 cannot be accurately determined based solely on the time of transmission of the optical pulse 30 and the time the return portion 34 is received, processed and provided to the readout circuitry 26. Instead, the delays through the imaging device 10 circuitry should be accounted for in order to accurately determine the distance to the object 50.

In order to account for the delays, the reference SPAD array 16 is provided to receive the reference portion 32 of the optical pulse 30. The reference portion 32 is reflected by the optical barrier 40, which is provided at a location very near to the light-emitting device 12, such that the time of flight of the reference portion 32 is very short, and near zero. Further, the reference SPAD array 16, reference SPAD front end circuitry 20 and reference routing channel 24 may be designed to have the same, or substantially the same, propagation delays as the return SPAD array 14, return SPAD front end circuitry 18 and return routing channel 22. That is, the imaging device 10 may be designed such that the path length or transmission time from the return SPAD array 14 to the readout circuitry 26 matches or substantially matches the path length or transmission time from the reference SPAD array 16 to the readout circuitry 26. Accordingly, the distance to the object 50 may be determined based on the difference between the time a signal representing detection of the return portion 34 of the optical pulse 30 is received by the readout circuitry 26, and the time a signal representing detection of the reference portion 32 is received by the readout circuitry 26, as the delays through the various circuitry in the imaging device 10 are matched between the return and reference paths.

The readout circuitry 26 utilizes suitable circuitry, such as time-to-digital converters or time-to-analog converters that generate an output indicative of a time difference that may then be used to determine the time of flight of the transmitted optical pulse 30 or the distance to the object 50, as will be appreciated by those skilled in the art.

The imaging device 10 further includes a driver 36 (which may be a vertical cavity surface emitting laser (VCSEL) driver, as shown in FIG. 1) that generates a driving signal for driving the light-emitting device 12 (which may be a vertical cavity surface emitting laser (VCSEL), as shown in FIG. 1), e.g., for controlling the generation and output of the optical pulse 30 by the light-emitting device 12.

The driver 36 is controlled by a controller 28, which provides a control signal (e.g., a synthesized digital pulse) to the driver 36, which in response generates and provides the driving signal to the light-emitting device 12 for driving the output optical pulse 30. The controller 28 may provide the control signal to the driver 36 through the readout circuitry 26, as shown in FIG. 1.

In the imaging device 10 of FIG. 1, delays are introduced through each of the components shown as the digital control signal is transmitted from the controller 28 to the driver 36, output as an optical pulse 30 by the light-emitting device 12, received by the return and reference SPAD arrays 14, 16, processed by the return and reference SPAD front end circuitry 18, 20 and routed through the return and reference routing channels 22, 24 to the readout circuitry 26. The delays through each component vary, with some being more significant delays than others.

For example, a first delay from the time the digital control signal is generated by the controller 28 to the time it is received as input by the driver 36 may be on the order of several nanoseconds.

A second source of delay is introduced from the time the driver 36 receives the input control signal to the time the driver 36 outputs the driving signal, which may be on the order of several hundred picoseconds.

A third source of delay is introduced from the time the light-emitting device 12 receives the driving signal until the time the light-emitting device 12 outputs the optical pulse 30, which may be on the order of several tens of picoseconds and less than about 200 picoseconds.

A fourth source of delay is introduced from the time a photon arrives at the return and reference SPAD arrays 14, 16 until the return and reference SPAD arrays 14, 16 output respective detection signals, which may be on the order of several hundreds of picoseconds.

A fifth source of delay is introduced as the photon detection signal propagates through the return and reference SPAD front end circuitry 18, 20 (e.g., propagation delays through pulse shaping and OR-tree circuitry), which may be on the order of several hundred picoseconds. In some embodiments, the pulse shaping and/or OR-tree circuitry may be included within the return and reference SPAD arrays 14, 16, in which case, this delay may be included as part of the fourth source of delay.

A sixth source of delay is introduced through the return and reference routing channels 22, 24, which may be on the order of several hundred picoseconds. Because the reference and return paths are matched (i.e., designed to have a same path length or propagation times and thus experience the same total delays), each of the first through sixth delays are commonly experienced by the signals (e.g., reference and return detection signals) received by the readout circuitry 26, and thus the distance to the object 50 may be accurately determined based on the difference in time of receiving these signals by the readout circuitry 26.

It will be readily appreciated that the first, second, fourth, fifth and sixth sources of delay make up the most significant, or dominant, sources of delays through the imaging device 10. These delays vary from several hundred picoseconds (i.e., the second, fourth, fifth and sixth sources of delay) to several nanoseconds (i.e., the first source of delay). Additionally, at least some portion of these sources of delay (e.g., the first delay between the controller 28 and the input to the driver 36) are not fixed, but instead are voltage and/or temperature dependent delays. The third source of delay (i.e., the delay from the driver 36 output to generation of the optical pulse 30), on the other hand, is a minor or non-dominant delay.

Figure 2:
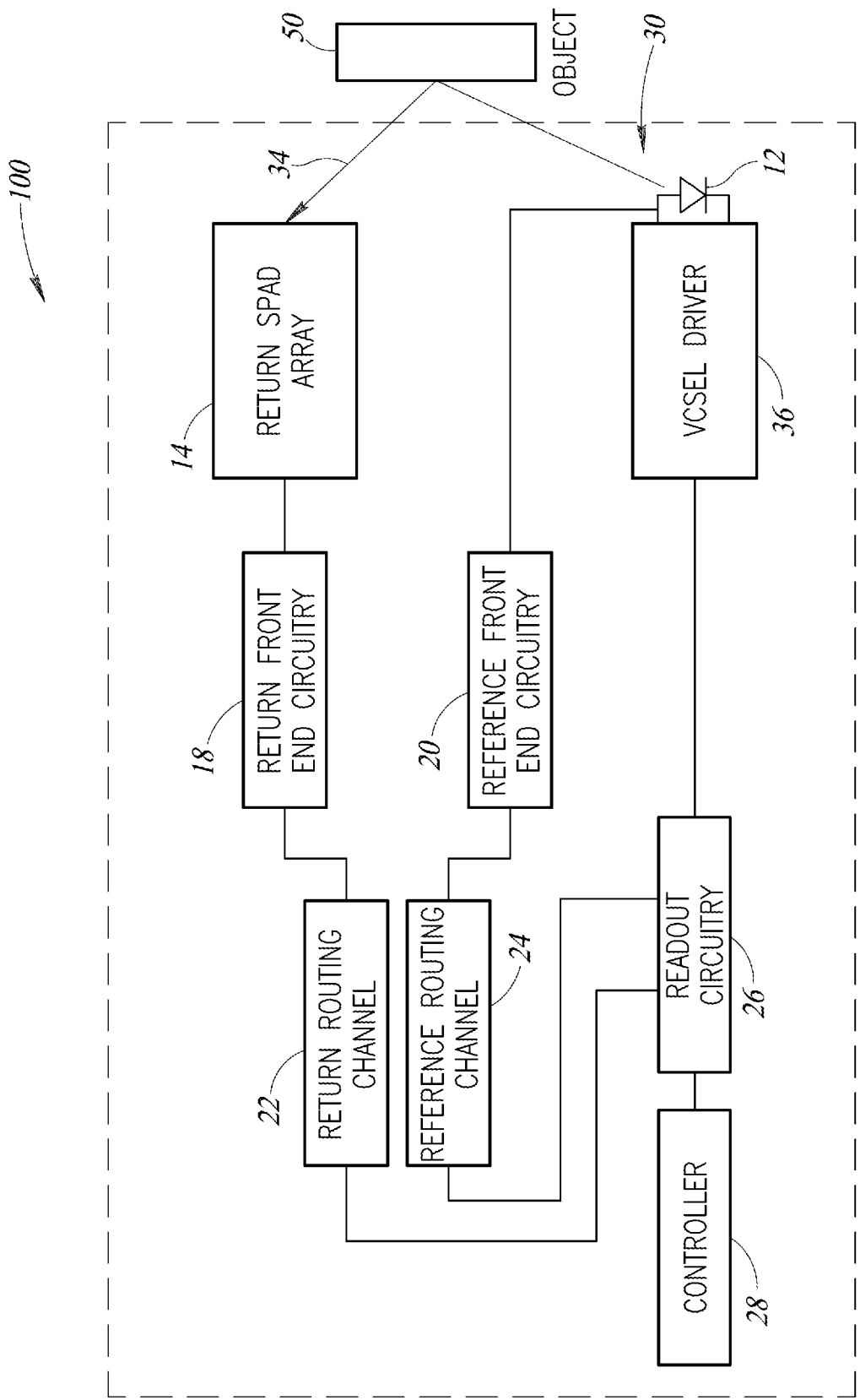
FIG. 2 is a block diagram illustrating an imaging device having a single SPAD array, in accordance with embodiments of the present disclosure.

FIG. 2 is a block diagram illustrating an imaging device 100, in accordance with one or more embodiments of the present disclosure. The imaging device 100 of FIG. 2 is similar in structure and function to the imaging device 10 of FIG. 1 except for the differences that will be discussed below. The features shared by the imaging devices 10 and 100 will not be described here again in the interest of brevity.

The main difference between the imaging device 100 shown in FIG. 2 and the imaging device 10 shown in FIG.

1 is that the reference SPAD array 16 in the imaging device 10 of FIG. 1 is not present in the imaging device 100 of FIG. 2. Instead, the imaging device 100 includes a reference path that is electrically coupled to the light-emitting device 12 and thus receives the driving signal provided to the light-emitting device 12 (which may be a VCSEL, as shown in FIG. 2) from the driver 36 (which may be a VCSEL driver, as shown). That is, the reference path receives, as a reference signal, the driving signal provided to the light-emitting device 12. This reference signal is then routed through the reference SPAD front end circuitry 20 and the reference routing channel 24, just like in the imaging device 10 of FIG. 1.

The reference signal thus mimics the function of the reference portion 32 of the optical pulse 30 that is received by the reference SPAD array 16 and outputs a detection signal to the reference SPAD front end circuitry 20 in the imaging device 10 of FIG. 1. That is, the reference signal received from the driving signal to the light-emitting device 12, in the imaging device 100, serves as a reference time and the distance to the object 50 may be determined by the readout circuitry 26 based on the time difference between receiving, by the readout circuitry 26, the return portion 34 of the optical pulse 30 (i.e., after processing through the return SPAD front end circuitry 18 and the return routing channel 22) and the reference or driving signal (i.e., after processing through the reference SPAD front end circuitry 20 and the reference routing channel 24).

As noted above, the dominant sources of delay are the first, second, fourth, fifth and sixth delay sources. The first, second, fifth and sixth delays are present in the imaging device 100 of FIG. 2, just as they are in the imaging device 10 of FIG. 1, and are experienced by both the reference and return paths. Accordingly, these dominant system delays are removed, thereby minimizing voltage and temperature dependent offsets.

Additionally, while the third and fourth delay sources (i.e., the delays through the light-emitting device 12 and the return SPAD array 14) are not accounted or compensated for in the imaging device 100, these are minor sources of delay in comparison with the first, second, fifth and sixth delays. Thus, while the determined distance to the object 50 may be somewhat less accurate than with the imaging device 10 of FIG. 1, it may still be of sufficient accuracy for a variety of applications that may not be as sensitive to absolute range accuracy, including, for example, gesture detection or recognition, user detection or the like. Additionally, by removing the reference SPAD array 16 from the imaging device 100, significant advantages may be achieved in the way of saving space on a chip in the device and reduced power consumption (as the reference array is not present or not used, and thus does not draw power).

While the imaging device 100 of FIG. 2 is shown without a reference SPAD array, in one or more embodiments, the imaging device 100 may include a reference SPAD array (not shown) and the reference SPAD array may be bypassed during certain ranging or distance determining functions. For example, the imaging device 100 may include a switching element 38 (shown for example in FIG. 1) for selectively coupling an input of the reference path (e.g., an input to the reference front end circuitry 20) to the driving signal provided to the light-emitting device 12 in a first mode of operation, and to an output of an included reference SPAD array in a second mode of operation. Accordingly, in the first mode of operation, the imaging device 100 may bypass the reference SPAD array and determine the distance to the object 50 using the driving signal as a reference signal, as shown in FIG. 2. In the second mode of operation, the imaging device 100 selectively couples the reference SPAD array to the reference path (and selectively decouples the driving signal from the reference front end circuitry 20), and the readout circuitry 26 may thus determine the distance to the object 50 based on the signals received from both the return SPAD array 14 and the reference SPAD array. The first mode of operation may be used for applications that are not particularly sensitive to absolute range accuracy (e.g., gesture recognition or detection, user detection, etc.), and power consumption may thus be reduced by bypassing the reference SPAD array. The second mode of operation may be used for other applications where increased absolute range accuracy is important.

Figure 3:
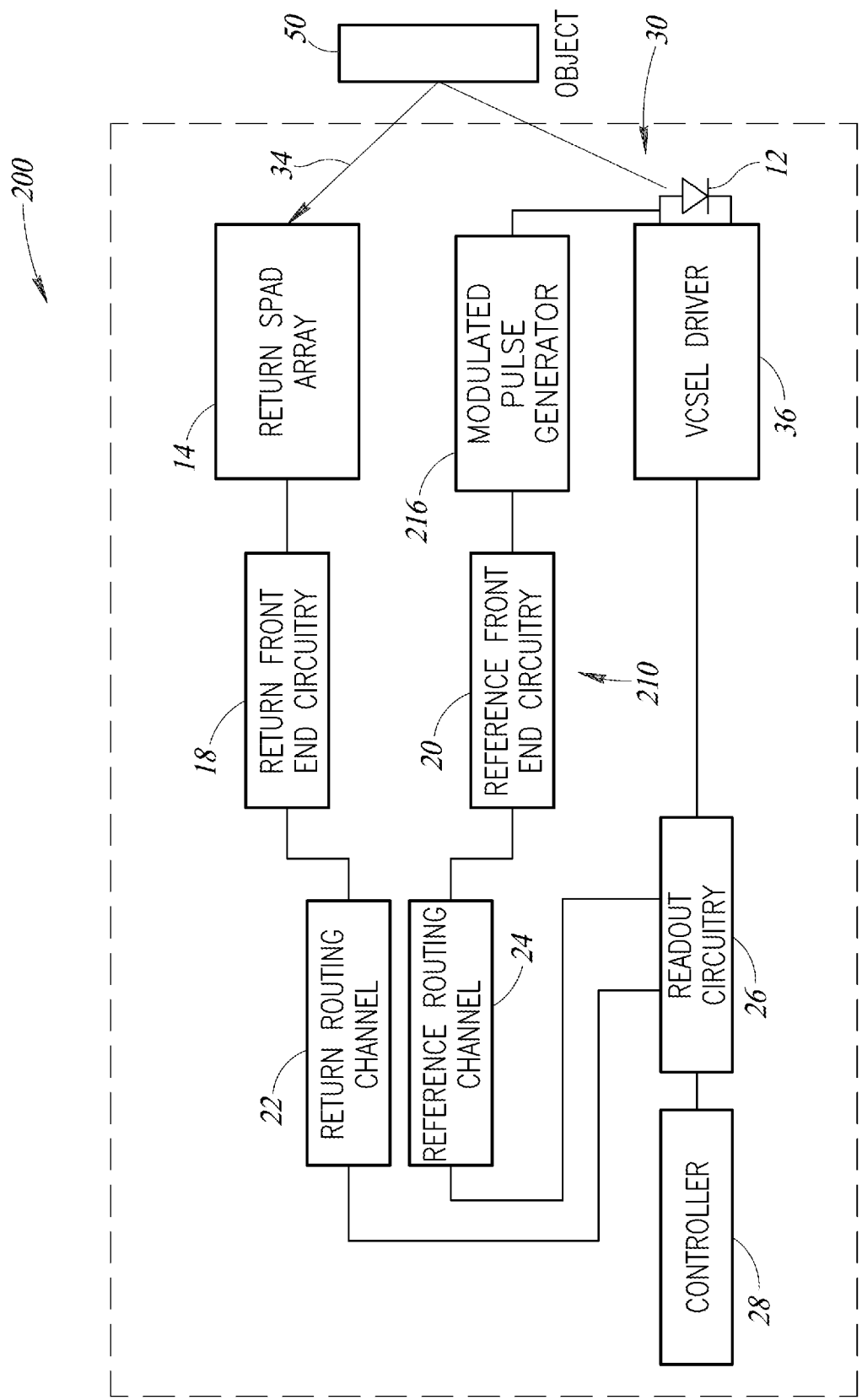
FIG. 3 is a block diagram illustrating an imaging device including a modulated pulse generator, in accordance with one or more embodiments of the present disclosure.

FIG. 3 is a block diagram illustrating an imaging device 200, in accordance with one or more embodiments of the present disclosure. The imaging device 200 of FIG. 3 is similar in structure and function to the imaging device 100 of FIG. 2 except for the differences that will be discussed below.

In particular, the imaging device 200 of FIG. 3 similarly includes a reference path that is electrically coupled to the light-emitting device 12 and receives the driving signal provided to the light-emitting device 12 as a reference signal. However, the main difference is that the reference path 210 of the imaging device 200 includes a modulated pulse generator 216, which receives the reference signal (i.e., the driving signal provided to the light-emitting device 12) and generates a pulse that is supplied to the reference SPAD front end circuitry 20. By generating a pulse, the modulated pulse generator 216 may provide a signal to the reference SPAD front end circuitry that mimics the signal that would be provided by a reference SPAD array in an imaging device (e.g., the imaging device 10 of FIG. 1) including such a reference SPAD array. That is, instead of directly providing the driving signal to the reference SPAD front end circuitry 20, the modulated pulse generator outputs a digital pulse signal for processing by the reference SPAD front end circuitry 20 and then is provided to the readout circuitry 26 through the reference routing channel 24.

In one or more embodiments, the modulated pulse generator 216 introduces a delay to the received reference signal (i.e., the driving signal provided to the light-emitting device 12) which is modulated throughout a readout time, in order to better match the functionality of a reference SPAD array triggered by optical input pulse and provide a more accurate range measurement. As noted above, in a conventional imaging device, signals from both the return and reference arrays are provided to front end circuitry and routed to readout circuitry for determining the time of flight of a transmitted optical pulse. A true reference array measurement generally locks onto the center of the transmitted VCSEL pulse, and the optical output provides a window of light for detecting potential SPAD events (i.e., a detectable reflection from an object). The modulated pulse generator 216 thus quantizes the reference signal by adding a modulated delay to the received reference signal, which allows the center of the received reference signal (a pulse signal) to be determined (e.g., by the reference front end circuitry 20 and/or the readout circuitry 26).

Figure 4:
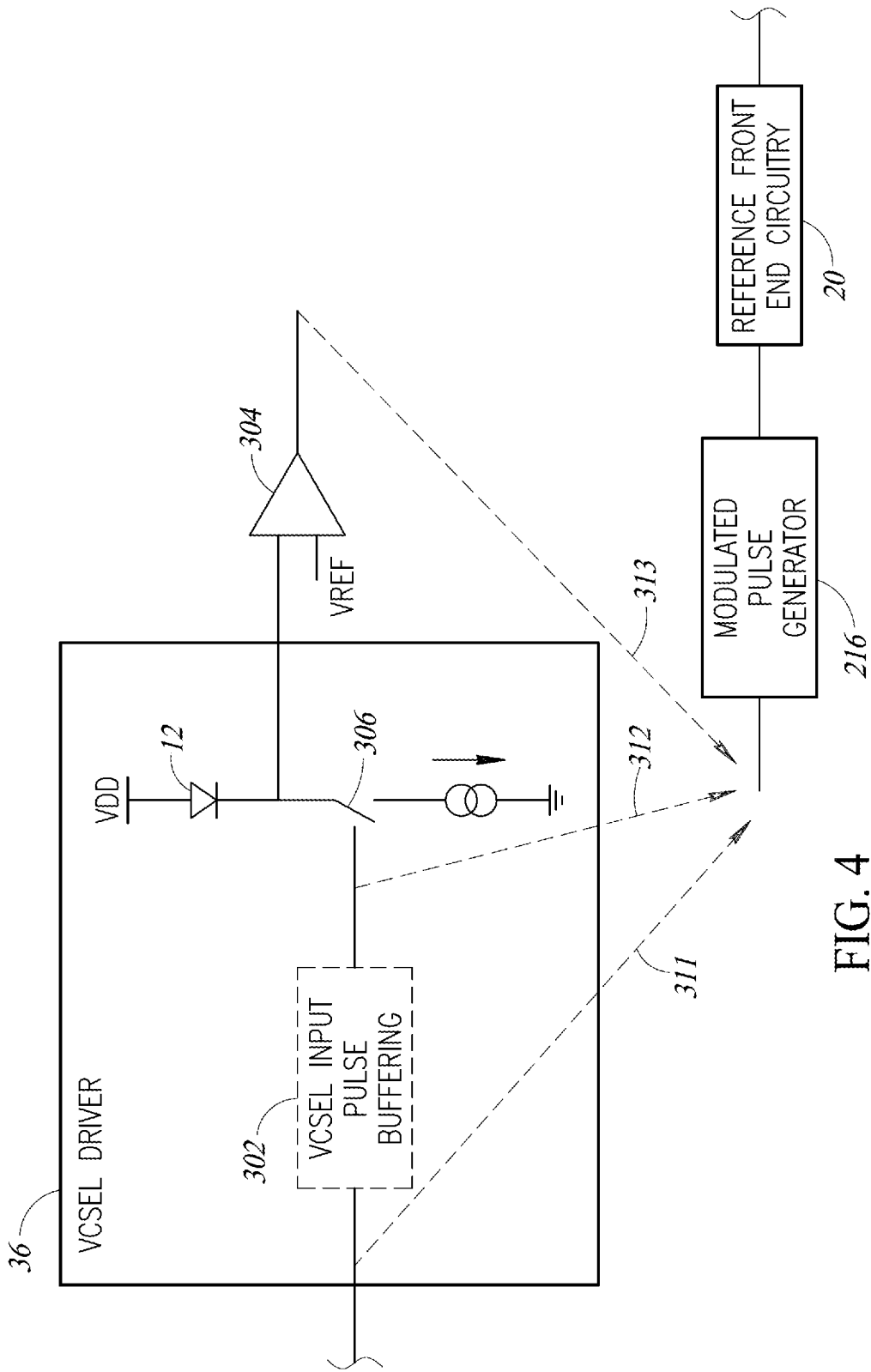
FIG. 4 is a block diagram illustrating further details of the driver and modulated pulse generator of the imaging device shown in FIG. 3, in accordance with one or more embodiments of the present disclosure.

FIG. 4 is a block diagram illustrating further details of the driver 36 and modulated pulse generator 216, in accordance with one or more embodiments. In particular, FIG. 4 illustrates various points from which a driving signal may be tapped and supplied to the modulated pulse generator 216.

As shown in FIG. 4, the driver 36 may be a VCSEL driver that includes a VCSEL input pulse buffering stage 302 that buffers an input pulse provided as input to the driver, and provides a buffered output pulse to an output stage of the driver 36 (e.g., to a control terminal of a switching element 306, such as a transistor, which supplies a conduction path for turning on the light-emitting device 12 based on the buffered output pulse). Further, the light-emitting device 12 may be included within or as part of the driver 36, as shown in FIG. 4.

As shown at 311, the modulated pulse generator 216 may be coupled to an input of the driver 36, and thus receives an input pulse of the driver 36. The modulated pulse generator 216 thus may generate and provide a modulated pulse signal to the reference SPAD front end circuitry 20 based on the signal provided at the input of the driver 36.

Alternatively, as shown at 312, the modulated pulse generator 216 may be coupled to an output of the VCSEL input pulse buffering stage 302, and thus receives as input a pulse that controls the output stage of the driver 36. The modulated pulse generator 216 may thus generate and provide a modulated pulse signal to the reference SPAD front end circuitry 20 based on the output of the VCSEL input pulse buffering stage 302.

As another alternative, as shown at 313, the modulated pulse generator 216 may be coupled to an output of a comparator 304 that has a first input coupled to a cathode (as shown) or an anode of the light-emitting device 12. A second input is coupled to a reference voltage (VREF). Accordingly, the comparator outputs a signal indicating that the light-emitting device 12 has "fired" (i.e., has generated an output optical pulse 30) by comparing the voltage at the cathode (or anode, depending on the actual VCSEL driver design, as will be readily appreciated by those skilled in the relevant art) with a reference voltage (VREF). The modulated pulse generator 216 thus generates and provides a modulated pulse signal to the reference SPAD front end circuitry 20 based on the output of the comparator 304 indicating that the light-emitting device 12 has output an optical pulse.

The modulated pulse generator 216 may be or include any modulated pulse generation circuitry for generating a modulated pulse output based on the received driving signal. In particular, the modulated pulse generator 216 may be or include any circuitry for quantizing and introducing delay into the received driving signal. For example, in one or more embodiments, the modulated pulse generator 216 may include a series of flip-flops arranged as a shift register, with each of the flip-flops controlling the charging and discharging of an associated load capacitor. The flip-flops may have a clock input configured to receive the driving signal such that, through the duration of a received pulse, the shift register sequentially couples the load capacitors to an output of the modulated pulse generator 216, thereby providing a quantized and delayed reference signal to the reference front end circuitry 20. In another embodiment, the modulated pulse generator 216 may include a multiplexer having a plurality of inputs, with each input coupled to the driving signal through a different number of delay elements, such as a digital buffer or the like. For example, the driving signal may be coupled to the first input through one delay element, to the second input through two delay elements, to the third input through three delay elements, and so on. The multiplexer may select the inputs sequentially such that the multiplexer outputs the driving signal as a quantized signal having a modulated delay.

Figure 5:
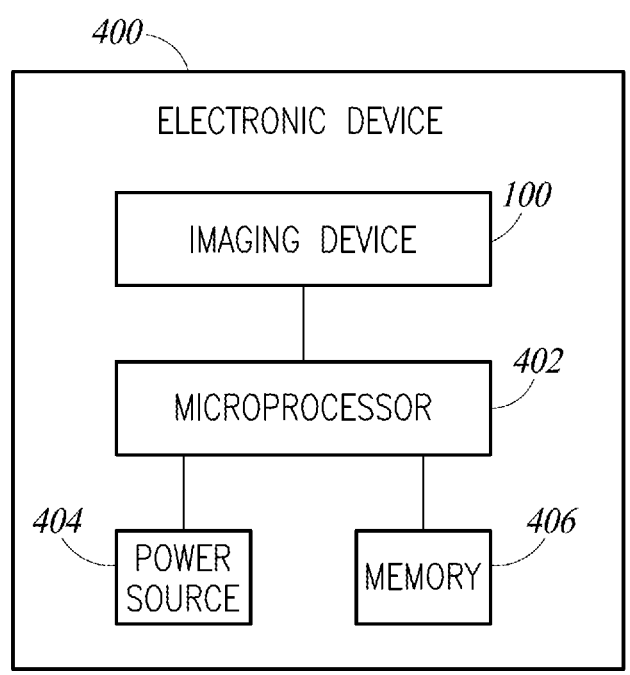
FIG. 5 is a block diagram illustrating an electronic device including an imaging device, in accordance with embodiments of the present disclosure.

FIG. 5 shows an electronic device 400 including an imaging device described herein, such as the imaging device 100 or the imaging device 200, coupled to a microprocessor 402. The microprocessor 402 may be any circuit configured to receive or send electrical signals to the imaging device 100 or 200, and in one or more embodiments, may be or include the controller 28. The electronic device 400 may further include a power source 404 configured to provide electric power for the device 400. The power source 404, which may be a battery, may be coupled to the microprocessor 402. The electric device 400 may also include a memory 406 coupled to or incorporated in the microprocessor 402.

In one or more embodiments, the electronic device 400 may be a cell phone, smartphone, tablet, camera, and/or wearable computing device that may be located in clothing, shoes, watches, glasses or any other wearable structures. In some embodiments, the electronic device 400, or the imaging device 100 or 200 itself, may be located in a vehicle, such as boat and car, a robot, or any other moveable structure or machinery. The electronic device 400 may include all of the features and functionalities thus described with respect to the imaging device 100 or 200, and may be used, for example, for gesture recognition or detection, user detection, proximity detection or the like.

While the readout circuitry 26 has been described herein as receiving two separate signals (e.g., a first signal indicative of the return portion 34 of the optical pulse 30, and a second signal indicative of the driving signal), which may be received at respective separate terminals, it should be readily appreciated that the readout circuitry 26 may have a single terminal for receiving each of these signals, for example, by sequentially switching between the signals provided via the reference and return paths.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An imaging device, comprising:
a light-emitting device configured to generate an optical pulse;
a driving circuit coupled to the light-emitting device and configured to generate a driving signal, the light-emitting device configured to generate the optical pulse based on the driving signal;
a return single-photon avalanche diode (SPAD) array configured to receive a reflected first portion of the optical pulse;
an optical barrier configured to reflect a second portion of the optical pulse;
a reference SPAD array configured to receive the reflected second portion of the optical pulse; and
readout circuitry coupled to the return SPAD array and configured to be selectively coupled to the driving circuit in a first mode of operation, and to be selectively coupled to the reference SPAD array in a second mode of operation, the readout circuitry being configured to receive a signal indicative of the reflected first portion of the optical pulse, wherein:
in the first mode of operation, the readout circuitry is configured to receive a signal indicative of the driving signal, and to determine a distance between the imaging device and an object based on a difference between a time of receiving the signal indicative of the reflected first portion of the optical pulse and a time of receiving the signal indicative of the driving signal; and in the second mode of operation, the readout circuitry is configured to receive a signal indicative of the reflected second portion of the optical pulse, and to determine the distance between the imaging device and the object based on a difference between a time of receiving the signal indicative of the reflected first portion of the optical pulse and a time of receiving the signal indicative of the reflected second portion of the optical pulse.

2. The imaging device of claim 1, further comprising:
return front end circuitry coupled to the return SPAR array;
a return routing channel coupled between the return front end circuitry and the readout circuitry;
reference front end circuitry coupled to the driving circuit; and
a reference routing channel coupled between the reference front end circuitry and the readout circuitry.

3. The imaging device of claim 1, further comprising:
a modulated pulse generator coupled between the driving circuit and the readout circuitry, the modulated pulse generator being configured to detect the driving signal and to generate a modulated pulse signal based on the detected driving signal.

4. The imaging device of claim 3, wherein the modulated pulse generator is coupled to the driving circuit and is configured to detect the driving signal based on an input pulse provided to the driving circuit.

5. The imaging device of claim 3, the driving circuit including an input pulse buffering stage configured to buffer an input pulse received at the driving circuit and to output a control pulse to control an output stage of the driving circuit, wherein the modulated pulse generator is coupled to the input pulse buffering stage and is configured to detect the driving signal based on the control pulse provided to the input pulse buffering stage.

6. The imaging device of claim 3, further comprising a comparator having a first input coupled to the light-emitting device and a second input coupled to a reference voltage, wherein the modulated pulse generator is coupled to an output of the comparator and is configured to detect the driving signal based on the output of the comparator.

7. The imaging device of claim 1, wherein the light-emitting device comprises at least one of a vertical cavity surface emitting laser (VCSEL) and a light-emitting diode (LED).

8. The imaging device of claim 1, further comprising:
a switch that electrically isolates the reference SPAD array from the readout circuitry in the first mode of operation.

9. A method, comprising:
generating a driving signal by a driving circuit;
receiving the driving signal by a light-emitting device;
generating an optical pulse by the light-emitting device, based on the driving signal, and transmitting the optical pulse into an image scene;
receiving, by a return single-photon avalanche diode (SPAD) array, a reflected first portion of the optical pulse;
providing a signal indicative of the reflected first portion of the optical pulse to readout circuitry;
in a first mode of operation, providing a signal indicative of the driving signal to the readout circuitry;

in the first mode of operation, determining by the readout circuitry a distance to an object based on a difference between a time of receiving the signal indicative of the reflected first portion of the optical pulse and a time of receiving the signal indicative of the driving signal in a second mode of operation, receiving a reflected second portion of the optical pulse by a reference SPAD array;

in the second mode of operation, receiving, at the readout circuitry, a signal indicative of the reflected second portion of the optical pulse;

in the second mode of operation, determining the distance to the object based on a difference between a time of receiving the signal indicative of the reflected first portion of the optical pulse and a time of receiving the signal indicative of the reflected second portion of the optical pulse; and selectively coupling the readout circuitry to the driving circuit in the first mode of operation and to the reference SPAD array in the second mode of operation.

10. The method of claim 9, further comprising:
detecting the driving signal by a modulated pulse generator coupled between the driving circuit and a reference front end circuit; and
generating a modulated pulse signal, by the modulated pulse generator, based on the detected driving signal.

11. The method of claim 10, wherein the modulated pulse generator is coupled to an input of the driving circuit, the modulated pulse generator detecting the driving signal based on an input pulse provided to the input of the driving circuit.

12. The method of claim 10, wherein the modulated pulse generator is coupled to an output of an input pulse buffering stage of the driving circuit, the modulated pulse generator detecting the driving signal based on a control pulse provided at the output of the input pulse buffering stage.

13. The method of claim 10, wherein the modulated pulse generator is coupled to an output of a comparator, the comparator having a first input coupled to the light-emitting device and a second input coupled to a reference voltage, the modulated pulse generator detecting the driving signal based on the output of the comparator.

14. The method of claim 9, wherein the light-emitting device includes at least one of a vertical cavity surface emitting laser (VCSEL) and a light-emitting diode (LED).

15. The method of claim 9, further comprising:
electrically isolating the reference SPAD array from the readout circuitry in the first mode of operation.

16. An electronic device, comprising:
a microprocessor; and
an imaging device coupled to the microprocessor, the imaging device including:
a light-emitting device configured to generate an optical pulse;
a driving circuit coupled to the light-emitting device and configured to generate a driving signal, the light-emitting device being configured to generate the optical pulse based on the driving signal;
a return single-photon avalanche diode (SPAD) array configured to receive a first portion of the optical pulse, the first portion being reflected by an object in an image scene;
an optical barrier configured to reflect a second portion of the optical pulse;
a reference SPAD array configured to receive the reflected second portion of the optical pulse; and
readout circuitry coupled to the return SPAD array and configured to be selectively coupled to the driving circuit in a first mode of operation, and to be selectively coupled to the reference SPAD array in a second mode of operation, the readout circuitry being configured to receive a signal indicative of the received first portion of the optical pulse, wherein:

in the first mode of operation, the readout circuitry is configured to receive a signal indicative of the driving signal, and to determine a distance between the imaging device and the object based on a difference between a time of receiving the signal indicative of the received first portion of the optical pulse and a time of receiving the signal indicative of the driving signal; and in the second mode of operation, the readout circuitry is configured to receive a signal indicative of the reflected second portion of the optical pulse, and to determine the distance between the imaging device and the object based on a difference between a time of receiving the signal indicative of the received first portion of the optical pulse and a time of receiving the signal indicative of the reflected second portion of the optical pulse.

17. The electronic device of claim 16, wherein the light-emitting device includes at least one of a vertical cavity surface emitting laser (VCSEL) and a light-emitting diode (LED).

18. The electronic device of claim 16, wherein the imaging device further includes a modulated pulse generator coupled to the driving circuit and configured to detect the driving signal and to generate a modulated pulse signal based on the detected driving signal.

19. The electronic device of claim 16, wherein the imaging device further includes:
a switch that electrically isolates the reference SPAR array from the readout circuitry in the first mode of operation.

20. The electronic device of claim 16, wherein the electronic device is at least one of a cell phone, smartphone, tablet, camera, and a wearable computing device.

* * * * *

UNITED STATES PATENT AND TRADEMARK OFFICE
CERTIFICATE OF CORRECTION

PATENT NO. : 11,604,265 B2
APPLICATION NO. : 16/696984
DATED : March 14, 2023
INVENTOR(S) : Caixin Zhuang et al.

It is certified that error appears in the above-identified patent and that said Letters Patent is hereby corrected as shown below:

In the Claims

Column 12, Claim 9, Line 20:
"SPAR" should read: --SPAD--.

Column 14, Claim 19, Line 15:
"SPAR" should read: --SPAD--.

Signed and Sealed this
Second Day of May, 2023

Katherine Kelly Vidal
*Director of the United States Patent and Trademark Office*